(12) United States Patent
Hicks et al.

(10) Patent No.: US 11,738,943 B2
(45) Date of Patent: Aug. 29, 2023

(54) PROCESSED USED-MATERIAL COLLECTION AND TRANSFER SYSTEM AND METHOD

(71) Applicant: Lasso Loop Recycling LLC., San Mateo, CA (US)

(72) Inventors: Aldous M. Hicks, London (GB); Philip Sanders, London (GB)

( * ) Notice: Subject to any disclaimer, the term of this patent is extended or adjusted under 35 U.S.C. 154(b) by 11 days.

(21) Appl. No.: 17/467,567

(22) Filed: Sep. 7, 2021

(65) Prior Publication Data

US 2023/0076374 A1 Mar. 9, 2023

(51) Int. Cl.
| | |
|---|---|
| B65F 3/00 | (2006.01) |
| B65F 3/12 | (2006.01) |
| B65F 3/04 | (2006.01) |
| B65F 3/02 | (2006.01) |
| B65F 3/14 | (2006.01) |

(52) U.S. Cl.
CPC .............. *B65F 3/001* (2013.01); *B65F 3/041* (2013.01); *B65F 3/12* (2013.01); *B65F 3/02* (2013.01); *B65F 3/14* (2013.01); *B65F 2003/022* (2013.01); *B65F 2003/023* (2013.01); *B65F 2003/025* (2013.01); *B65F 2003/0246* (2013.01); *B65F 2003/0263* (2013.01)

(58) Field of Classification Search
CPC .. B65F 3/001; B65F 3/041; B65F 3/12; B65F 2003/022; B65F 2003/0246; B65F 2003/0263
See application file for complete search history.

(56) References Cited

U.S. PATENT DOCUMENTS

| | | | |
|---|---|---|---|
| 3,294,265 A * | 12/1966 | Roch | B65F 7/005 15/352 |
| 4,573,641 A | 3/1986 | DeWoolfson et al. | |
| 4,919,274 A | 4/1990 | Hammond | |
| 5,071,303 A * | 12/1991 | Carson | B65F 1/006 414/408 |
| 5,205,698 A * | 4/1993 | Mezey | B65F 3/04 414/409 |
| 5,217,538 A | 6/1993 | Buchholz et al. | |
| 5,226,519 A | 7/1993 | DeWoolfson | |
| 5,344,273 A * | 9/1994 | Radlein | B65F 3/201 414/407 |

(Continued)

*Primary Examiner* — James Keenan
(74) *Attorney, Agent, or Firm* — David Guerra

(57) ABSTRACT

A content collection system and method for curbside collecting of multiple segregated recycled material streams stored in a product storage container. The product storage container can include a compartment and a door associated with the compartment. A product collection interface is associated with a product collection vehicle, and is configured to engage with any configuration of product storage container. A product transfer module is associated with the product collection interface and is configured to receive content from the product storage container. The product transfer module includes weight sensors to calculate the weight of content in the product transfer module. A release mechanism is configured to discharge the content from the product transfer module to a bulk product holding unit associated with the vehicle. Software application can be utilized to request collection and/to receive collection data. Computer systems can be utilized to control operations of the system.

21 Claims, 8 Drawing Sheets

(56) References Cited

U.S. PATENT DOCUMENTS

| | | | | |
|---|---|---|---|---|
| 5,372,317 A | 12/1994 | Willis | | |
| 5,423,492 A | 6/1995 | Willis | | |
| 5,772,384 A * | 6/1998 | Richards | ................ | B65F 3/001 |
| | | | | 414/679 |
| 5,879,015 A * | 3/1999 | Ramsey | ................ | B65F 3/208 |
| | | | | 220/909 |
| 6,655,894 B2 * | 12/2003 | Boivin | ................ | B65F 3/001 |
| | | | | 414/408 |
| 8,146,798 B2 * | 4/2012 | Flood | ................ | G06Q 50/26 |
| | | | | 340/572.1 |
| 3,240,319 A1 | 8/2012 | Hicks | | |
| 8,674,243 B2 * | 3/2014 | Curotto | ................ | G01G 19/083 |
| | | | | 705/308 |
| 11,403,602 B2 * | 8/2022 | Gonen | ................ | G06Q 30/0215 |
| 2005/0038572 A1 * | 2/2005 | Krupowicz | ................ | B65F 3/00 |
| | | | | 700/305 |
| 2011/0116899 A1 * | 5/2011 | Dickens | ................ | G01G 19/083 |
| | | | | 414/21 |
| 2019/0255582 A1 * | 8/2019 | Boyle | ................ | B65F 3/001 |

* cited by examiner

PROCESSED USED-MATERIAL COLLECTION AND TRANSFER SYSTEM AND METHOD

BACKGROUND

Technical Field

The present technology relates to a processed used-material collection and transfer system and method for use in connection with collecting, transferring and weighing segregated processed used-material. The present technology can relate to optimizing the processing, collection and transfer of different types of processed used-material, and create or control a relationship between a user/customer and an entity that facilitates and performs the processing, collection and transfer management services, for the optimization of segregation, processing, collection, transfer, distribution, transportation and/or sale associated with used-material material management.

Background Description

Residential and other used-material collection systems typically either collect a mixed stream of used-materials sometimes referred to recyclables or focus on a single material stream. The materials they typically collect are contaminated with labels, neck rings, container caps, food debris and other contaminants. These used-materials are typically transferred to a material recovery facility where they are sorted, cleaned and processed with varying and mostly limited success.

Currently, the collection of residential used-material is performed in a date scheduled manner, so that it rarely optimizes the management of the pickup vehicles, since mostly the containers assigned for a given time of collection are not fully filled, so as to generate expenses in transportation that would be minimized if the containers are emptied out at the time when the containers are completely filled.

There are additional disadvantages with current used-material collection systems and methods, in that these systems do not weigh each segregated processed used-material separately, allowing for accurate data per user/customer.

The current used-material collection systems and methods, although meeting their collection function also incur enormous cost due to the lack of optimization in the management of collection, transport, unloading and recovery of the potential resources. In additional, these systems and methods do not provide a central data system for tracking amounts of used-material material collected per user/customer, and thus not able to provide used-material collection, processing and transfer data to customers for use in any reimbursement or subsidy programs.

A need exists for a new and novel used-material collection, processing and resultant recycled product transfer system and method that can be used for weighing segregated resultant recycled products. In this regard, the present technology substantially fulfills this need. In this respect, the used-material collection, processing and resultant recycled product transfer system and method according to the present technology substantially departs from the conventional concepts and designs of the prior art, and in doing so provides an apparatus primarily developed for the purpose of collecting, processing, storing, transfer and weighing of segregated resultant recycled products.

SUMMARY

In view of the foregoing disadvantages inherent in the known types of used-material, recycling and waste collection or waste management systems, the present technology provides a novel used-material collection, processing and resultant recycled product transfer system and method, and overcomes one or more of the mentioned disadvantages and drawbacks of the prior art.

As such, the general purpose of the present technology, which will be described subsequently in greater detail, is to provide a new and novel used-material collection, processing and resultant recycled product transfer system and method which has all the advantages of the prior art mentioned theretofore and many novel features that result in a used-material collection, processing and resultant recycled product transfer system and method which is not anticipated, rendered obvious, suggested, or even implied by the prior art, either alone or in any combination thereof.

According to one aspect, the present technology can include a used-material collection, processing and resultant recycled product storage container (PSC), a product collection interface (PCI), a product transfer module (PTM) and a bulk product holding unit (BPHU). The product storage container (PSC) can include one or more compartments with a door associated with each compartment. The compartment can be configured to store resultant recycled product or content. The product collection interface (PCI) can be associated with a vehicle. The product collection interface (PCI) can be configured to engage with any one or any combination of the product storage container (PSC), and the compartment or compartments of the product storage container (PSC). The bulk product holding unit (BPHU) can be associated with the product collection interface (PCI) and can be configured to receive the resultant recycled product or content of the compartment or compartments of the product storage container (PSC). The bulk product holding unit (BPHU) can include a weight determining unit and a release mechanism. The weight determining unit can be configured to determine or calculate a total weight of the resultant recycled product or content in each of the individual compartments of the product storage container (PSC). The release mechanism can be configured to discharge the resultant recycled product or content in each of the individual compartments of the product storage container (PSC) into the matching individual product storage compartments contained in the bulk product holding unit (BPHU) associated with the vehicle.

According to another aspect, the present technology can include a method for transferring the resultant recycled product or content into a bulk product holding unit (BPHU) utilizing a product collection vehicle (PCV). The method can include providing to a collection or transfer vehicle or a control center a collection or transfer request from a graphical user interface associated with a used-material collection, processing and resultant recycled product storage container appliance or an electronic device including at least one processing and at least one memory in operable communication with processing unit. The graphical user interface can include at least one selectable element or affordance. Positioning a product storage container (PSC) at a location accessible to the collection or transfer vehicle. Receiving by a computer system of the collection or transfer vehicle residence or place information from the product storage container (PSC), and the collection or transfer request.

Determining, by the computer system of the product collection vehicle (PCV), if the residence or place information from the product storage container (PSC) matches residence or place information of the collection or transfer request, and if so then operating a product collection module (PCM) which incorporates an end effector configured to manipulate and align the product storage container (PSC) to engage with a product collection interface (PCI) of the product collection vehicle (PCV). Opening a door associated with the product storage container (PSC) so that the resultant recycled product or content in the product storage container (PSC) is discharged into the product transfer module (PTM) and then onto a bulk product holding unit (BPHU) in the product collection vehicle (PCV). Weighing each of the resultant recycled products or contents into the bulk product holding unit (BPHU) to generate weight data for each resultant recycled products or content. Discharging the resultant recycled products or content from the bulk product holding unit (BPHU) of the product collection vehicle (PCV). Providing the weight data to any one or any combination of a computer system of the control center, and the electronic device.

According to yet another aspect, the present technology can include a non-transitory computer readable medium with an executable program stored thereon comprising instructions for execution by at least one processing unit for managing a resultant recycled products or content collection or transfer system, such that the instructions when executed by the at least one processing unit causes the at least one processing unit to receive, by the at least one processing unit, a collection or transfer request from a graphical user interface used-material collection, processing and resultant recycled product storage container appliance or an electronic device. Then to dispatch a product collection vehicle (PCV) to a residence or place associated with the collection or transfer request. Then to confirm residence or place information received from a product storage container (PSC) matches residence or place information in the collection or transfer request. Then after the resultant recycled products or content are received from the product storage container (PSC) they are weighed before they are transferred into a bulk product storage unit (BPSU). Then to create weight data associated with the resultant recycled products or content, and to provide the weight data to the control center or the electronic device.

According yet to another aspect, the present technology can include a client-side electronic system for controlling a resultant recycled products or content collection or transfer operation. The client-side electronic system can include a memory and a processor that are respectively configured to store and execute software instructions, including instructions that are organized into a collection or transfer request component, a dispatching component, a confirmation component, a weighing component, and a weight data component. The collection or transfer request component can be configured or configurable to provide a collection or transfer request from a graphical user interface collection, processing and resultant recycled product storage container appliance or an electronic device to a product collection vehicle (PCV) or a control center. The dispatching component can be configured or configurable to dispatch a product collection vehicle (PCV) to a residence or place associated with the collection or transfer request. The confirmation component can be configured or configurable to confirm residence or place information received from a product storage container (PSC) matches residence or place information in the collection or transfer request. The weighing component can be configured or configurable to weigh resultant recycled products or content in a product storage container (PSC) of the collection or transfer received from the product storage container (PSC). The weighing component can be further configured or configurable to create weight data associated with the resultant recycled products or content, and to provide the weight data to the control center or the electronic device.

Some or all embodiments of the present technology can include a product transfer module (PTM) attached to and associated with the product collection vehicle (PCV). The product collection module (PCM) incorporating an end effector configured to manipulate and center the product storage container (PSC), can be used to raise and reliably engage the product storage container (PSC) with the product collection interface (PCI).

Some or all embodiments of the present technology can include an arm articulately associated with the product collection vehicle (PCV) and the product transfer module (PTM). The arm can be configured to raise and manipulate the product storage container (PSC) to engage with the product collection interface (PCI).

In some or all embodiments, the product collection module (PCM) can include a locking mechanism configured to secure the product storage container (PSC) to the product collection module (PCM).

In some or all embodiments, the locking mechanism can be an eccentric hook configured to engage with a pin of the product storage container (PSC).

In another embodiment, the locking mechanism can be an electromagnetic controlled device configured to engage with the product storage container (PSC).

In some or all embodiments, the interface or connection between the product storage container (PSC) and product transfer module (PTM) is the product collection interface (PCI).

In some or all embodiments, the product collection interface (PCI) has doors that match the doors on the product storage container (PSC).

In some or all embodiments, the matching doors when open allow resultant recycled products or content to transfer from the individual product storage container (PSC) compartments through the product collection interface (PCI).

In some or all embodiments, the resultant recycled products or content having transferred past the product collection interface (PCI) are transferred into the compartments of the bulk product holding unit (BPHU) via the product transfer module (PTM).

In some or all embodiments, the product storage container (PSC) can include a transmitting device configured to transmit data to a receiving device on the product collection module (PCM), the product collection interface (PCI) or the product collection vehicle (PCV).

In some or all embodiments, the transmitting device can be a radio-frequency identification tag, and the receiving device is a radio-frequency identification reader.

In some or all embodiments, the release mechanism can be a flap associated with a discharge end of the product transfer module (PTM).

In some or all embodiments, the weight determining unit can be associated with the flap.

In some or all embodiments, the product transfer module (PTM) can include a receiving end configured to receive the resultant recycled products or content from each individual compartment of the product storage container (PSC). The receiving end can include an air nozzle configured to dispense a blast of air into each individual compartment of the product storage container (PSC).

In some or all embodiments, a compartment of the product storage container (PSC) can be a plurality of compartments, and the product collection interface (PCI) including a plurality of doors or opening corresponding with the compartments of the bulk product holding unit (BPHU).

In some or all embodiments, the bulk storage compartment of the bulk product holding unit (BPHU) can be a plurality of storage compartments each configured to receive a single or mixed stream of resultant recycled products or content from one of the compartments of the product storage container (PSC).

In some or all embodiments, a receiving end of the product transfer module (PTM) can be a plurality of receiving ends each configured to receive resultant recycled products or content from one of the compartments of the product storage container (PSC) when the product storage container (PSC) is correctly positioned with the product collection interface (PCI).

In some or all embodiments, the product transfer module (PTM) can include one discharge end configured to receive resultant recycled products or content from each of the receiving ends.

In some or all embodiments, the release mechanism can be a flap associated with the discharge end, and the weight determining unit can be associated with the flap, the discharge end or another aspect of the product transfer module (PTM).

In some or all embodiments, the release mechanism can be a flap associated with an input or inlet to the bulk product holding unit.

In some or all embodiments, the release mechanism can be a series of rotating containers capable of weighing contained materials and associated with an input or inlet to the bulk product holding unit.

Some or all embodiments of the present technology can include an electronic device and a graphical user interface. The electronic device can include at least one processing unit in operable communication with at least one memory and a display. The graphical user interface can be associated with the electronic device and displayable on the electronic device. The graphical user interface can include at least one selectable element or affordance configured or configurable to provide at least one input associated with a collection or transfer request provided to the product collection vehicle (PCV) or a control center for dispatching the product collection vehicle (PCV).

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is therefore an object of the present technology to provide a new and novel used-material collection or transfer system and method that has all of the advantages of known recycling and waste collection and or management systems and none of the disadvantages.

It is another object of the present technology to provide a new and novel used-material collection or transfer system and method that may be easily and efficiently manufactured and marketed.

An even further object of the present technology is to provide a new and novel used-material collection and transfer system and method that has a low cost of manufacture with regard to both materials and labor, and which accordingly is then susceptible of low prices of sale to the consuming public, thereby making such used-material collection or transfer system and method economically available to the buying public.

Still another object of the present technology is to provide a new used-material collection or transfer system and method that provides in the apparatuses and methods of the prior art some of the advantages thereof, while simultaneously overcoming some of the disadvantages normally associated therewith. These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some or all embodiments of the present technology may meet only one such object or none at all.

BRIEF DESCRIPTION OF THE DRAWINGS

The present technology will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENTS

Figure 1:
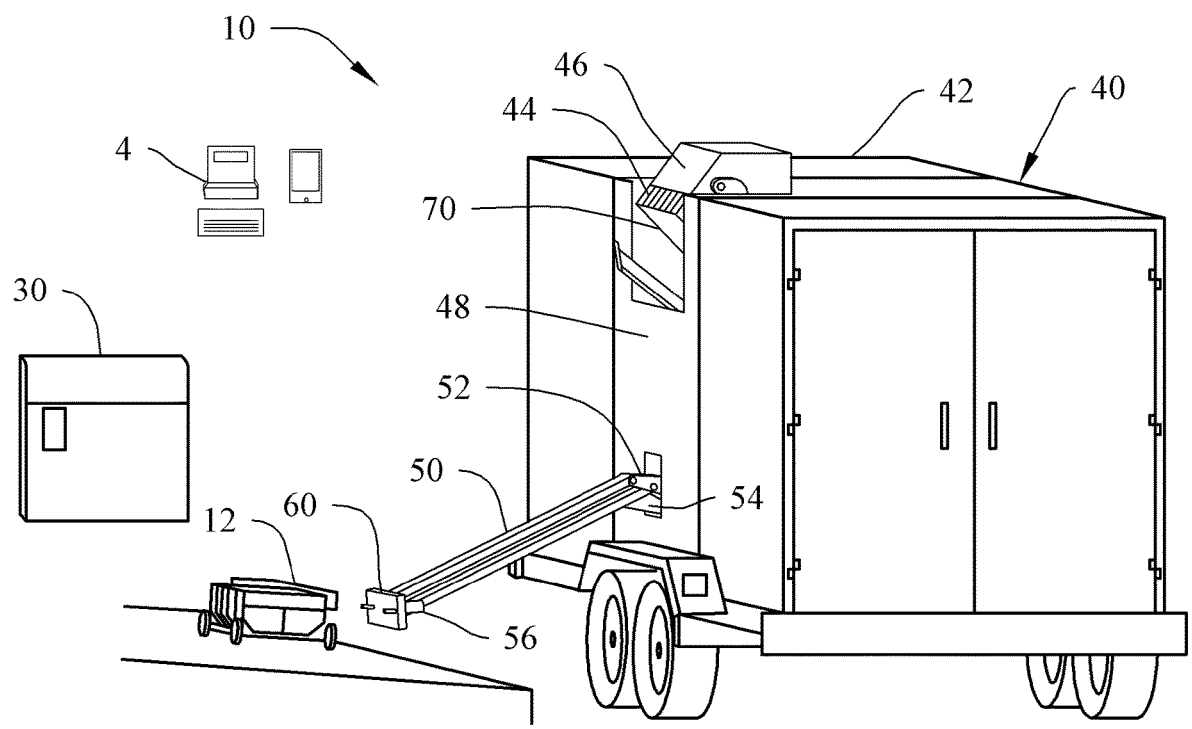
FIG. 1 is a perspective view of an embodiment of the used-material collection or transfer system and method constructed in accordance with the principles of the present technology, with the product storage container (PSC) removed from the appliance and placed curbside or elsewhere.

In the following description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

Referring now to the drawings, and particularly to FIGS. 1-11, an embodiment of the used-material collection or transfer system and method of the present technology is shown and generally designated by the reference numeral 10.

The term product storage container (PSC) recited herein can be described as a unit that separately stores multiple different type of content that has been individually and separately processed by an appliance, and is moved to the curbside or other place for collection as the content inside the PSC.

The term product transfer module (PTM) recited herein is attached to the bulk product holding unit (BPHU), and controls the transfer of separately resultant recycled products or content from the multiple container product storage container (PSC) into the content matching multiple containers in the bulk product holding unit (BPHU).

The term product collection interface (PCI) recited herein can be an aspect attached to the product transfer module (PTM) which is carried by a product collection vehicle (PCV) that interfaces directly with the PSC to facilitate the transfer of resultant recycled products or contents from the PSC to one or more compartments in the bulk product holding unit (BPHU) via the product transfer module (PTM).

The term bulk product holding unit (BPHU) recited herein can be individual containers used to hold the resultant recycled products or content streams from the PSC. The PTM facilitates the weighing of the resultant recycled products or contents before releasing them to the individual compartments of the bulk product holding unit (BPHU) within the product collection vehicle (PCV).

Figure 2:
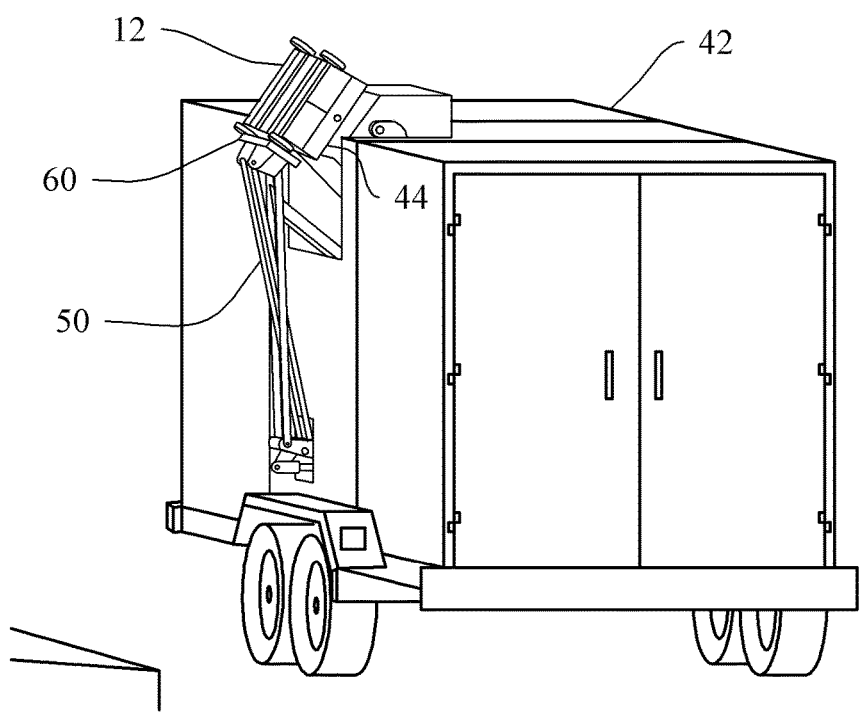
FIG. 2 is a perspective view of the product storage container (PSC) raised and fitted to the product collection interface (PCI) for discharging of resultant recycled products or contents.

In FIGS. 1 and 2, a new and novel used-material collection or transfer system and method 10 of the present technology for collecting or transferring and weighing segregated resultant recycled products or contents is illustrated and will be described. Broadly, the used-material collection or transfer system and method 10 has a PSC 12, a recycling appliance 30 and a collection vehicle 40. The present technology relates to a system and method of collecting or transferring multiple, segregated resultant recycled product or content streams that have already been cleaned, processed and stored in PSC 12 and left curbside or elsewhere outside a consumer's residence or other place. A consumer's residence could include, but not be restricted to, a private household, offices, shopping malls, airports, railway stations, educational institutions, entertainment venues, sporting venues, public places, factories, warehouses, building sites and hospitals. The retention of purity for each resultant recycled product or content stream is critical in maintaining the resultant recycled product or content value and its suitability for closed loop recycling.

The system 10 includes the product collection module (PCM) 50, which is connected to a product collection vehicle (PCV) 40. The product collection module (PCM) incorporates an end effector which captures, lifts and places the PSC in the correct position against the product collection interface (PCI) a sub assembly of the product transfer module (PTM) 46. The vehicle 40 includes bulk product holding units (BPHU's) 42 for each recycled material.

A user would remove the PSC 12 from its appliance 30, which can be located in the residence or elsewhere, and place it near a street or location capable of being accessed by the vehicle 40. The appliance 30 can include an internal cavity configured to receive one or more PSC 12, and can include openings defined in a top side thereof for allowing resultant recycled products or contents to deposited into separated bays or compartments of the PSC 12.

The vehicle 40 can include a recessed section 48 configured to receive the product collection module (PCM) 50, and the PCI 44 can include a face or flange or plate configured with doors or openings to match and align with the doors or openings of the PSC 12. With the product collection module (PCM) 50 received in the recessed section 48, the vehicle 40 is in a driving configuration with no or limited components extending out from the vehicle. Upon driving up to the PSC 12, the product collection module (PCM) 50 is pivoted and extended so it can securely engage with and raise the PSC 12 up to the PCI 44 being part of the PTM 46, as best illustrated in FIG. 2.

The product collection module (PCM) 50 can be a pivoting mechanism attached to the product collection vehicle (PCV) 40 via a hinged mount or attachment 52, and a first motive device 54 can be utilized to pivot the arm 50 in relation to the mount or attachment 52. An end effector 60 is located on the other end of the product collection module (PCM) 50 with a mechanism to capture and retain the product storage container 12 this can be a grab with arms or a grab with a plate with hooks 60 pivotably or fixed connected to the product collection module (PCM) 50, and can include additional motive devices 56 configured to rotate, extend, slide or pivot the product collection module (PCM) or end effector 60. The motive devices 54, 56 can be a motor system, a hydraulic system, a mechanical linkage system or a combination thereof.

Figure 3:
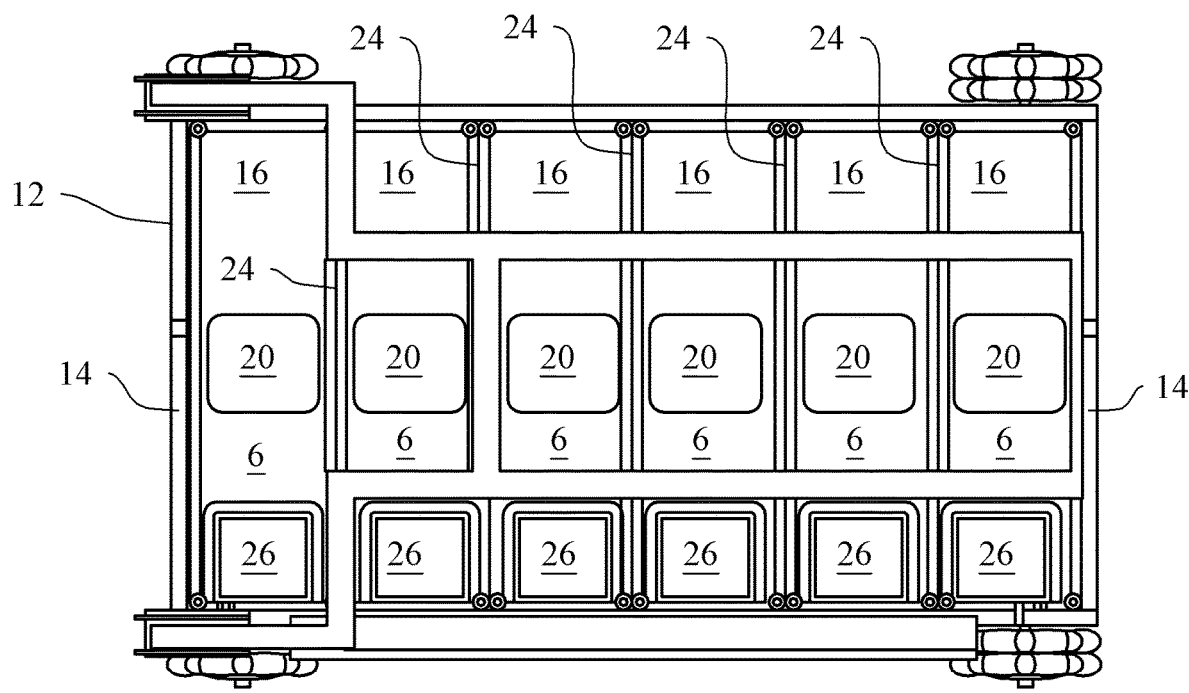
FIG. 3 is a top elevational view of the product storage container (PSC) of the present technology.

Referring to FIG. 3, the PSC 12 can include a housing with a perimeter face or lip 14 flat or extended out from a top side of the PSC 12. The face or lip 14 can be sized to be received in a recess or other geometry required by the PCI 44. The PSC 12 can define a single internal compartment or multiple internal compartments capable of receiving and storing resultant recycled products or contents via an openable bay door or doors 20, or can include a plurality of compartments 16 separated by internal baffles or walls 24 each including an openable bay door 20. The PSC can further include a radio-frequency identification (RFID) tag, sensor, sensor activator or transmitter(s) 26 associated with the PSC or each compartment 16, respectively. It can be appreciated that there can be any number of compartments, doors and tags.

Figure 4:
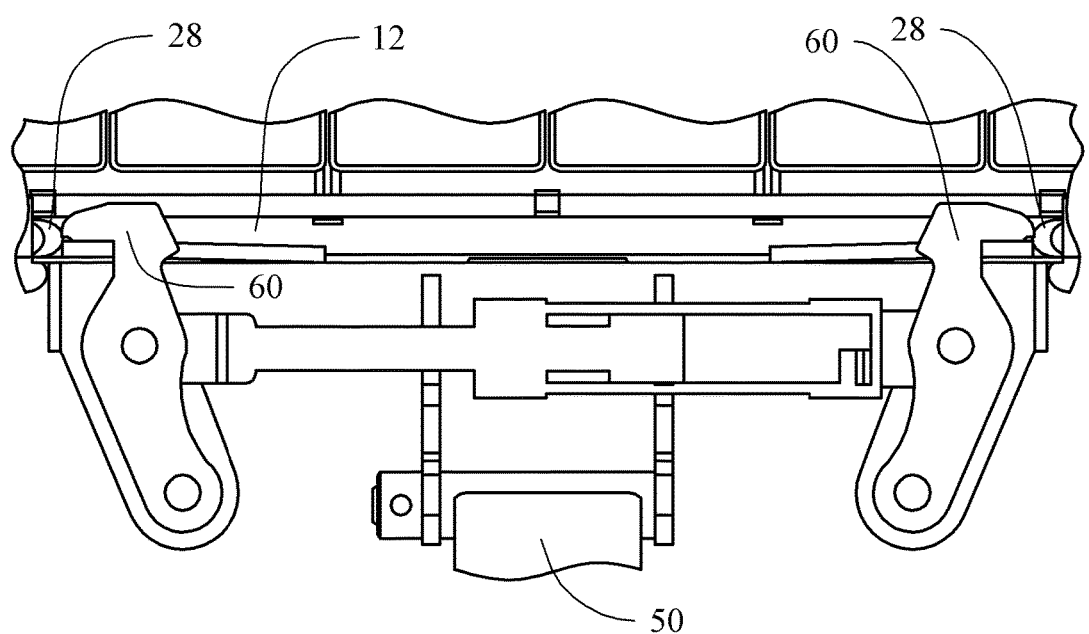
FIG. 4 is a cross-sectional view of one possible locking mechanism of the product collection module (PCM) end effector engaging with and pulling in the product storage container (PSC).
Figure 5:
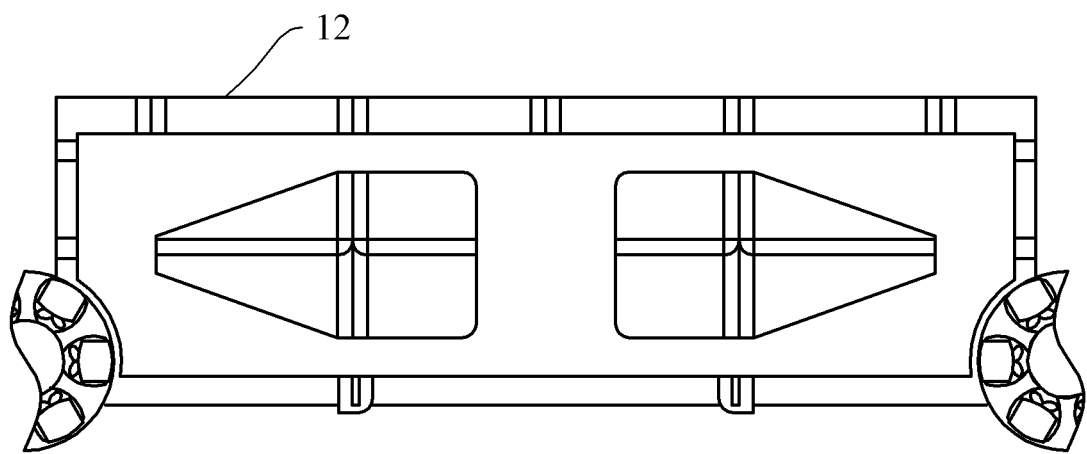
FIG. 5 is an example of the geometry that could be used in conjunction with the end effector to repeatably position the PSC on the PCM end effector.

Referring to FIGS. 4 and 5, the product collection module (PCM) receives the PSC and positions the PSC in relation to the PCI so as to align the doors or openings of the PSC 12 with the doors or openings of the PCI 44. The PCM end effector 60 is configured to reliably locate and lock to the PSC 12, thereby allowing the PCM 50 to lift the PSC 12 from the ground to an elevated and pivoted position.

The end effector 60 of the PCM utilizes a locking mechanism that engages with the PSC 12. This mechanism can take the form of, but is not limited to, an electromagnetic, mechanical, hydraulic or electrical system and draws the PSC 12 into correct alignment with the PCM end effector 60 before locking it into position.

Figure 6:
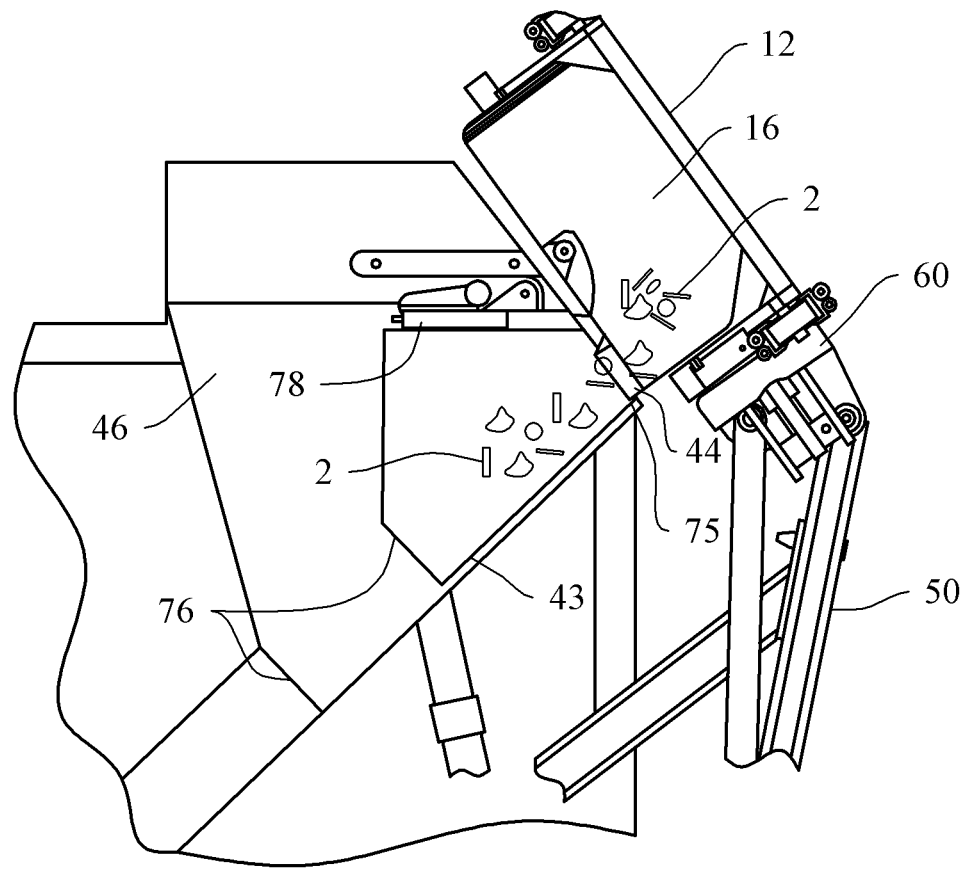
FIG. 6 is a cross-sectional view of the product storage container (PSC) fitted to the product collection interface (PCI) with resultant recycled products or contents being weighed and discharged into the bulk product holding unit (BPHU) of the product collection vehicle (PCV), and taken along a line through the center of one of the PSC storage bays in FIG. 2.

Referring to FIG. 6, once the PSC 12 has been secured to the PCM end effector 60, the PCM 50 can be activated to lift and pivot the PSC 12 into the PCI 44. In this position, the contents 2 of the PSC 12 are capable of being discharged therefrom and deposited into an internal storage compartment 43 of the product transfer module (PTM) 46. It can be appreciated that the PTM 46 can define a single storage compartment or a plurality of storage compartments with each compartment configured to receive the resultant recycled products or contents 2 of one of the compartments 16 of the PSC 12.

The PSC 12 can be mated to the PCI 44 via a gasket system to ensure there is no cross contamination between resultant recycled product or content streams during transfer from the PSC 12 to the internal storage compartment 43 of the product transfer module (PTM) 46.

The PCM end effector 60 can activate the storage bay doors 20 in the PSC 12 so they open and release the stored contents 2. In the exemplary, the PCM end effector 60 can connect electrically with the PSC 12 to activate the bay doors 20 using a motor system 22 housed within the PCM 60. It can be appreciated that the bay doors 20 can be operating in a number of other ways such as, but not limited to, a mechanical connection between the PTM end effector 60 and PSC 12 that operates the bay doors 20 upon contact with the PCI 44.

It can further be appreciated that one side of the PSC 12, preferably the side adjacently transverse to the bay doors 20, can include angled surfaces configured to encourage the resultant recycled products or contents 2 to flow from the PSC 12 toward the bay doors 20 and into the internal storage compartment 43 of the product transfer module (PTM) 46.

One or more air nozzles 75 can be associated with the product transfer module (PTM) 46 and/or the PCI 44 for blasting air into the compartment 16 to assist in dislodging any remaining contents 2 or forcing the resultant recycled products or contents 2 out of the compartment 16.

The discharge end 76 can include, but is not limited to a flap or rotating aspect 80 configured to contain the resultant recycled products or contents 2 in a vertical section of the PTM 46. The rotating aspect 80 or a portion of the discharge end 76 can include a load or weight sensor 78 configured to determine the weight of the resultant recycled products or contents 2 while in the internal storage compartment 43 of the product transfer module (PTM) 46.

Figure 7:
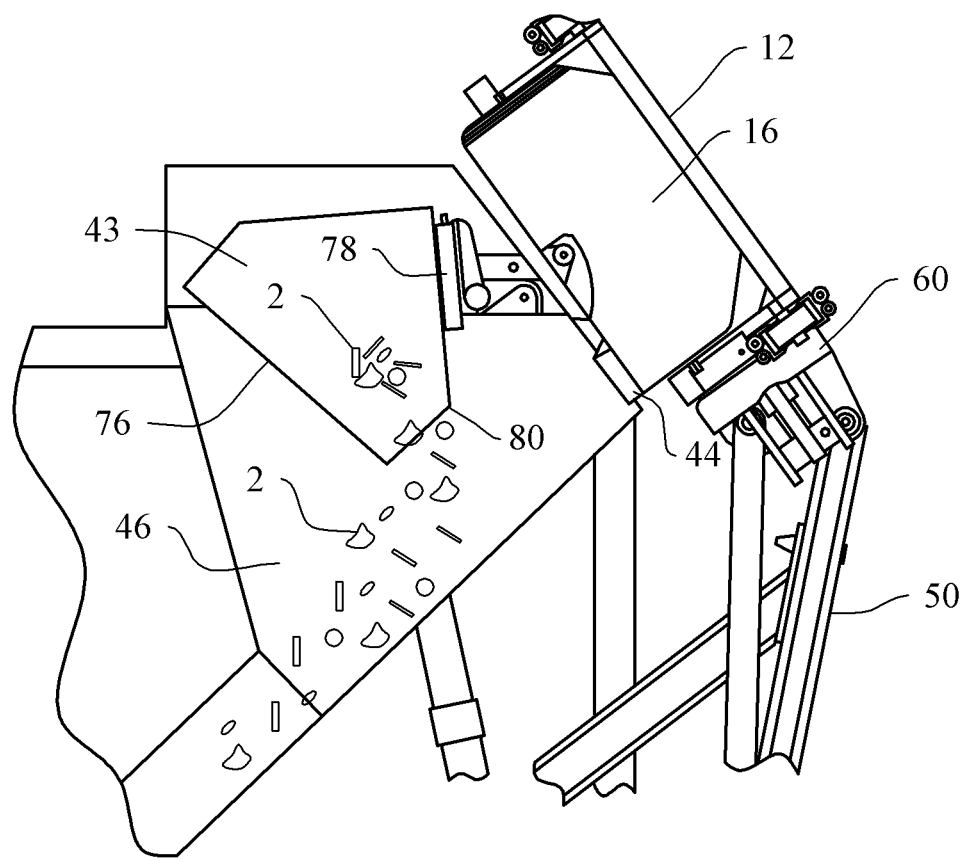
FIG. 7 is a cross-sectional view of weighed recycled product being discharged into the bulk product holding unit (BPHU) of the product collection vehicle (PCV), and taken along a line through the center of one of the PSC storage bays in FIG. 2.

Referring to FIG. 7, upon weighing the contents 2, the rotating aspect or flap 80 can be pivoted or moved so that the resultant recycled products or contents 2 therein are deposited into the appropriate bulk product holding unit (BPHU) 42. It can be appreciated that the weight sensor 78 can be located on the rotating aspect or flap 80, can be a load sensor associated with a pivoting or rotating aspect or a flap and configured to provide information that can calculated into a weight of the resultant recycled products or content 2.

The PCI 44 can include a RFID reader 112 configured to read the RFID tag 126 of the PSC 12. It can be appreciated that any other suitable contact-based or wireless communication system can be utilized between the PSC 12 and the PTM 46 or the vehicle 40.

Figure 8A:
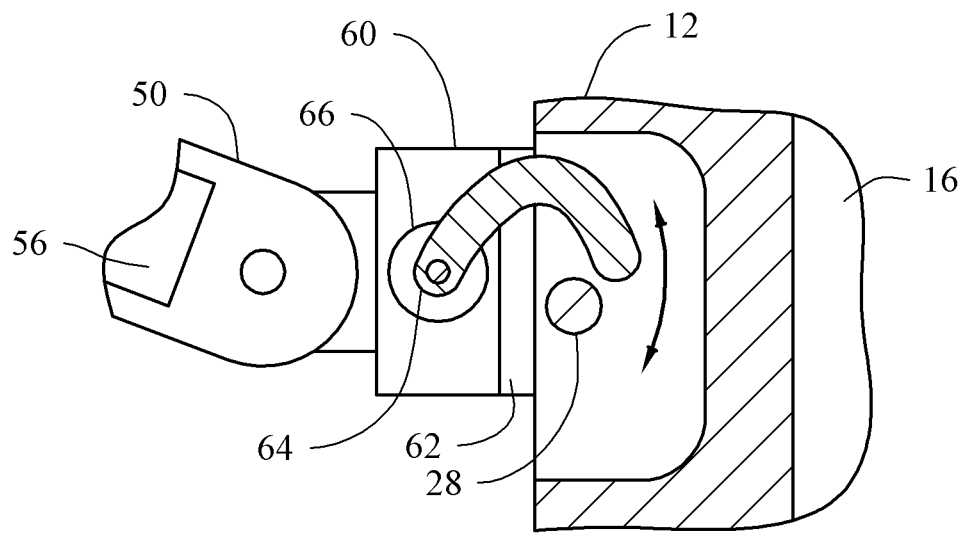
FIGS. 8A and 8B are side views of an alternate embodiment product collection module of the present technology.
Figure 8B:
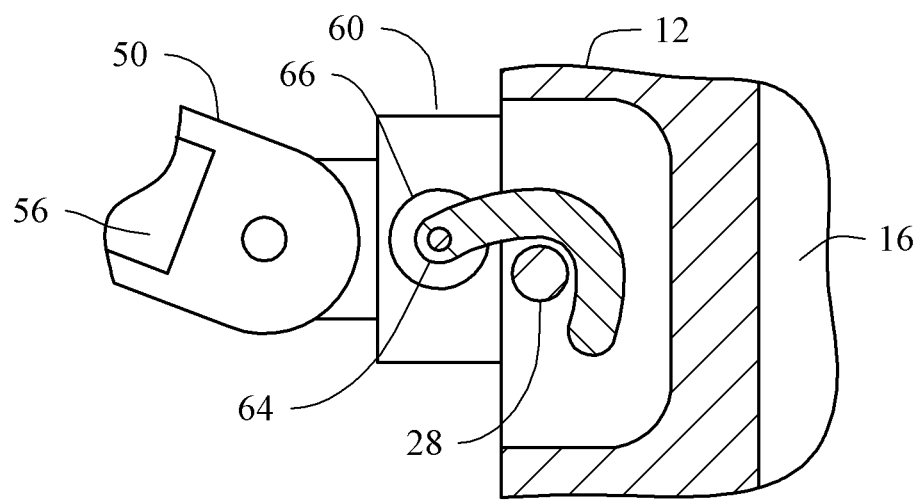

Referring to FIGS. 8A and 8B, an alternate embodiment of the PCM end effector utilizing an eccentric mechanical action to capture and align the PSC 12 to the PCM end effector 60. In this exemplary embodiment, the PCM end effector 60 can include a pair of forks or arms 62 in a spaced apart relation, and configured to receive therebetween the PSC 12. The space between the arms 62 can be adjustable or fixed to abut against an underside of the lip 14 of the PSC 12, thereby allowing the arms 62 to lift the PSC 12 from the ground to an elevated and pivoted position.

The arms 62 or a crossbeam of the PCM end effector 60 connecting the arms 62 can include a locking mechanism 64 that is engageable with a pin 28 of the PSC 12. In the exemplary, the locking mechanism 64 can be a rotatably hook that has a configuration capable of engaging with the pin 28 and pulling the PSC 12 towards the PSM 60 before locking it into position. The hook can be rotated by a motor 66, a hydraulic system or by a mechanical linkage that rotates the hook upon forward or reverse motion contact with the PCM 60.

Figure 9:
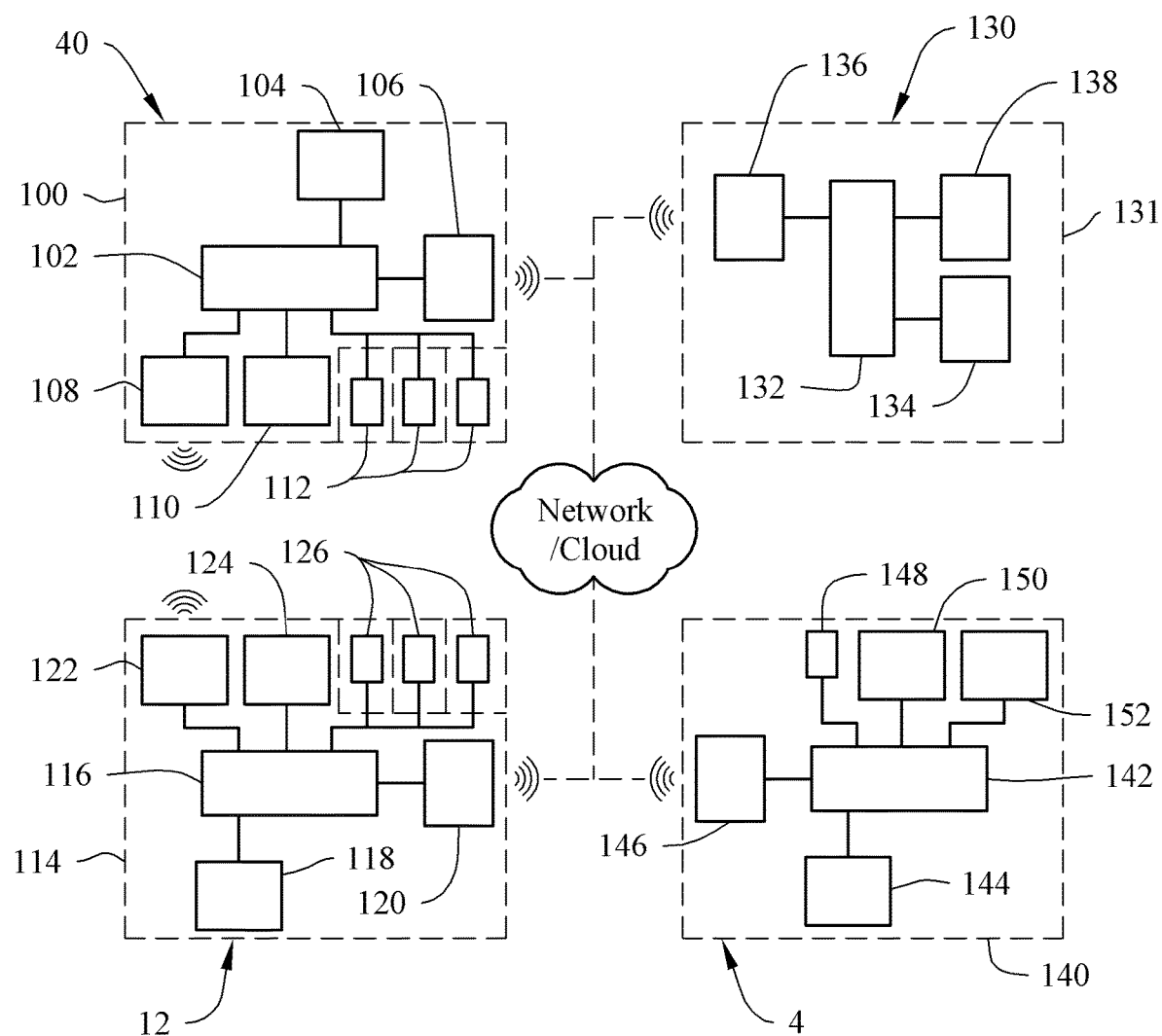
FIG. 9 is a block diagram view of the used-material collection or transfer system and method of the present technology.
Figure 10:
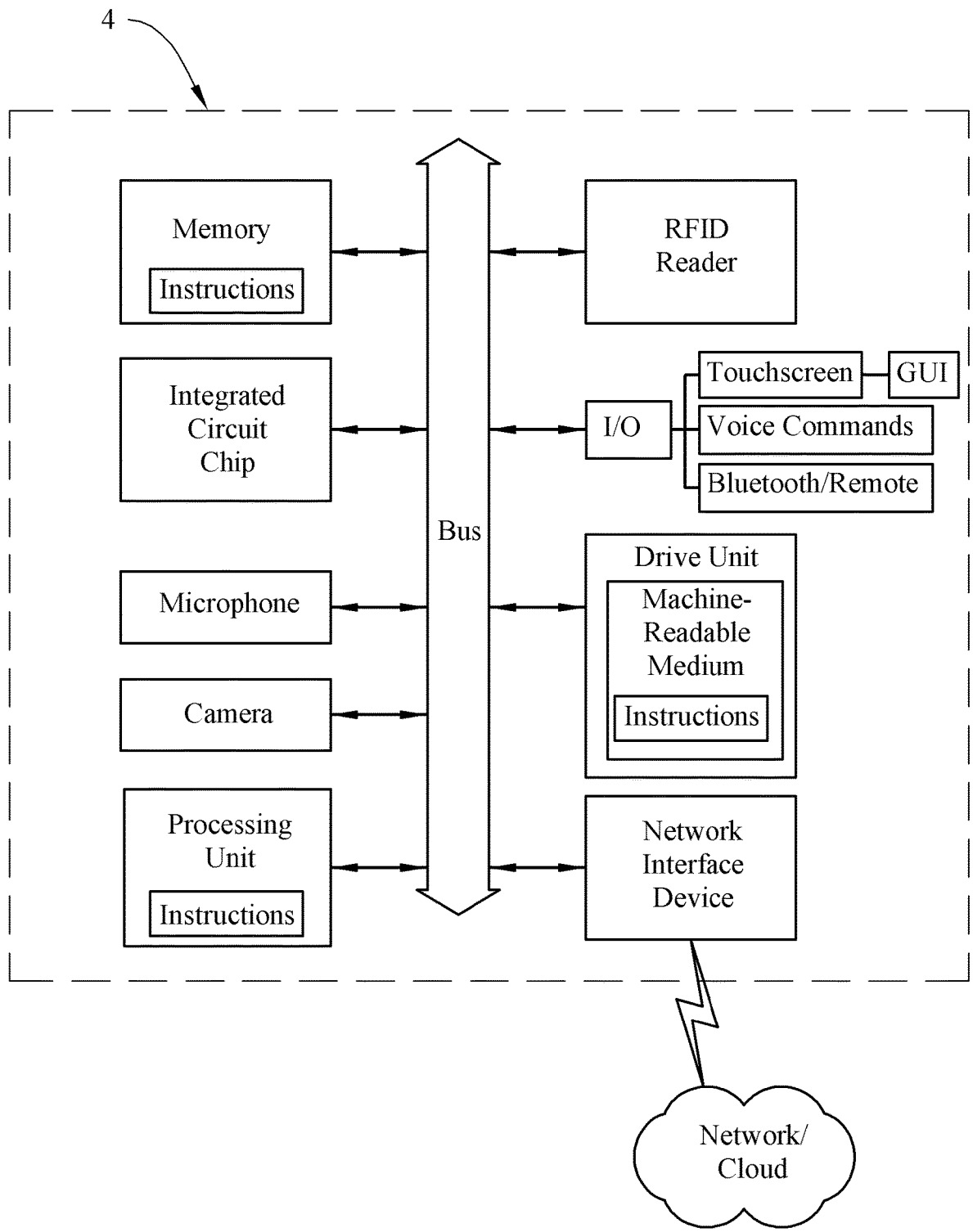
FIG. 10 illustrates an exemplary electronic computing device that may be used to implement an embodiment of the present technology.

With reference to FIGS. 9 and 10 a common software application can be associated with and/or executed by the electronic computing device, machine or system 4 and/or the product collection vehicle (PCV) 40. FIG. 9 illustrates, in the exemplary, possible components associated with the PSC 12, collection vehicle 40, the electronic device 4 and a control center 130 that can be utilized in performing operations and/or functions of the present technology.

The collection vehicle 40 can include a computer system 100 including a processing unit 102. At least one RAM memory and/or at least one non-volatile long term memory 104 can be operably connected or connectable with the processing unit 102. A network interface module 106 can be operably connected or connectable with the processing unit 102, and configured to transmit and/or receive data to the internet, network or cloud, or directly to a computer system 131 associated with the control center 130, to a computer system 114 associated with the PSC 12 or to a computer system 140 associated with the electronic device 4. The collection vehicle 40 can include a display, microphone, speaker and/or a data input device (not shown), all operably connected or connectable with the processing unit 102.

The computer system 100 can further include any one or combination of the following PSC data systems, such as but not limited to, a receiver or transceiver 108 can be operably connected or connectable with the processing unit 102, and configured to receive or transmit data with a corresponding receiver or transceiver 122 of the PSC 12. A radio-frequency identification (RFID) reader 110 can be operably connected or connectable with the processing unit 102, and configured to receive data from a RFID tag 126 associated with the PSC 12. One or more bay sensors or RFID readers 112 can be operably connected or connectable with the processing unit 102, and configured to receive a signal or be activated by a corresponding PSC bay sensor or RFID tag 126 associated with the PSC 12.

The PSC 12 can include a computer system 114 including a processing unit 116. At least one RAM memory and/or at least one non-volatile long term memory 118 can be operably connected or connectable with the processing unit 116. A network interface module 120 can be operably connected or connectable with the processing unit 116, and configured to transmit and/or receive data to the internet, network or cloud, or directly to the computer system 100 of the collection vehicle 40, to the computer system 131 of the control center 130 or to the computer system 140 of the electronic device 4. The PSC 12 can include a display, microphone, speaker and/or a data input device (not shown), all operably connected or connectable with the processing unit 116.

The computer system 114 can further include any one or combination of the following PSC data systems, such as but not limited to, a receiver or transceiver 122 can be operably connected or connectable with the processing unit 116, and configured to receive or transmit data with the corresponding receiver or transceiver 108 of the collection vehicle 40. A RFID tag 126 can be operably connected or connectable with the processing unit 116, and configured to transmit data to the RFID reader 110 of the collection vehicle 40. One or more PSC Bay sensors 126 can be operably connected or connectable with the processing unit 116, and configured to transmit a signal or provide activation with the sensor(s) 112 of the collection vehicle 40.

The control center 130 can include a computer network or system 131 including a processing unit 132. At least one RAM memory and/or at least one non-volatile long term memory 134 can be operably connected or connectable with the processing unit 132. A network interface module 136 can be operably connected or connectable with the processing unit 132, and configured to transmit and/or receive data to the internet, network or cloud, or directly to the computer system 100 of the collection vehicle 40, to the computer system 114 of the PSC 12 or to the computer system 140 of the electronic device 4. The control center computer system 131 can include a display, microphone, speaker and/or a data input device (not shown), all operably connected or connectable with the processing unit 132.

A database 138 can be accessible by the computer system 131 or the processing unit 132 to record or access data stored thereon. This data can be any data associated with any user/customer utilizing the present technology, any PSC utilizing the present technology, any collection vehicle utilizing the present technology, and any electronic device utilizing the present technology. Still further, any remote entity or system, if so authorized, may access data stored on the database 138. The database 138 can be part of the computer system 131 or can be remotely located and accessible by the computer system 131 via a wired or wireless network connection.

The electronic device 4 can be, but not limited to, smart phones, smart watches, tablets, notebooks, desktop computers, laptops, wearables, "Internet of Things" (IoT), and the like. The electronic device 4 can include a computer system 140 including a processor or multiple processors (e.g., CPU, GPU, or both) 142. At least one RAM memory and/or at least one non-volatile long term memory 144 can be operably connected or connectable with the processing unit 142. A network interface module 146 can be operably connected or connectable with the processing unit 142, and configured to transmit and/or receive data to the internet, network or cloud, or directly to the computer system 100 of the collection vehicle 40, to the computer system 131 of the control center 130 or to the computer system 114 of the PSC 12.

A user interface 152 and a display 150 can be associated with the computer system 140. The user interface 152 can be configured or configurable to allow a user to input data or commands for controlling an operation or software application. Additionally, a peripheral module 148 can be operably connected or connectable with the processing unit 142. The peripheral module 148 can be any one or combination of, but not limited to: a transceiver configured or configurable to communicate with receiver or transceiver 108 of the collection vehicle 40 or the receiver or transceiver 122 of the PSC 12; a RFID reader; and/or a bay sensor configured or configurable to read the signal or be activated by the PSC bay sensor(s) 126 of the PSC 12.

FIG. 10 is a diagrammatic representation of the electronic device 4 incorporated with an integrated circuit chip, which can be embedded with or connected to an exemplary RFID reader. The memory of the electronic device 4 can include a set of instructions for causing a component or electronic device 4 to perform any one or more of the methodologies discussed herein may be executed. The integrated circuit chip can be configured or configurable to include firmware for its operation. It can be appreciated that the integrated circuit chip can be embedded with any of the components of the electronic device 4. It can be appreciated that remote controls connected to the electronic device 4 through Bluetooth® or other protocols can be utilized.

The integrated circuit chip can include a computer or machine-readable medium on which is stored one or more sets of instructions and data structures (e.g., instructions) embodying or utilizing any one or more of the methodologies or functions described herein. The instructions are configured or configurable for operation of the processing unit, which can receive operational instructions from an interface or graphical user interface (GUI).

The device 4 can further include a number of different input (including simultaneous input from multiple feeds) and/or output (10) systems such as, but not limited to, a touchscreen and GUI, sonar or subsonic transmitter, receiver and/or transceiver, voice command, Bluetooth®, remote controller, on-screen gesture command or infrared. The device 4 or the storage container can further include a camera to record video or images to a memory/storage system such as, but not limited to, an internal memory, an external memory, external solid-state drive (SSD) or the cloud.

In various example embodiments, the electronic device 4 operates as a standalone device or may be connected (e.g., networked) to other devices. In a networked deployment, the electronic device may operate in the capacity of a server or a client machine in a server-client network environment, or as a peer machine in a peer-to-peer (or distributed) network environment. The electronic device may be a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that device. Further, while only a single electronic device is illustrated, the term "device" shall also be taken to include any collection of devices that individually or jointly execute a set (or multiple sets) of instructions to perform any one or more of the methodologies discussed herein.

The processor unit and memory of the electronic device 4 can communicate with each other via a bus. In other embodiments, the electronic device 4 may further include a video display (e.g., a liquid crystal display (LCD)). The electronic device 4 may also include an alpha-numeric input device(s) (e.g., a keyboard), a cursor control device (e.g., a mouse), a voice recognition or biometric verification unit (not shown), a drive unit (also referred to as disk drive unit), a signal generation device (e.g., a speaker), a universal serial bus (USB) and/or other peripheral connection, and a network interface device. In other embodiments, the electronic device 4 may further include a data encryption module (not shown) to encrypt data.

The processing unit can be a module operably associated with a drive unit, with the drive unit including a computer or machine-readable medium on which is stored one or more sets of instructions and data structures (e.g., instructions) embodying or utilizing any one or more of the methodologies or functions described herein. The instructions may also reside, completely or at least partially, within the memory and/or within the processors during execution thereof by the electronic device 4. The memory and the processors may also constitute machine-readable media.

The instructions may further be transmitted or received over a network via the network interface device utilizing any one of a number of well-known transfer protocols (e.g., Extensible Markup Language (XML)). While the machine-readable medium is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the device and that causes the device to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Figure 11:
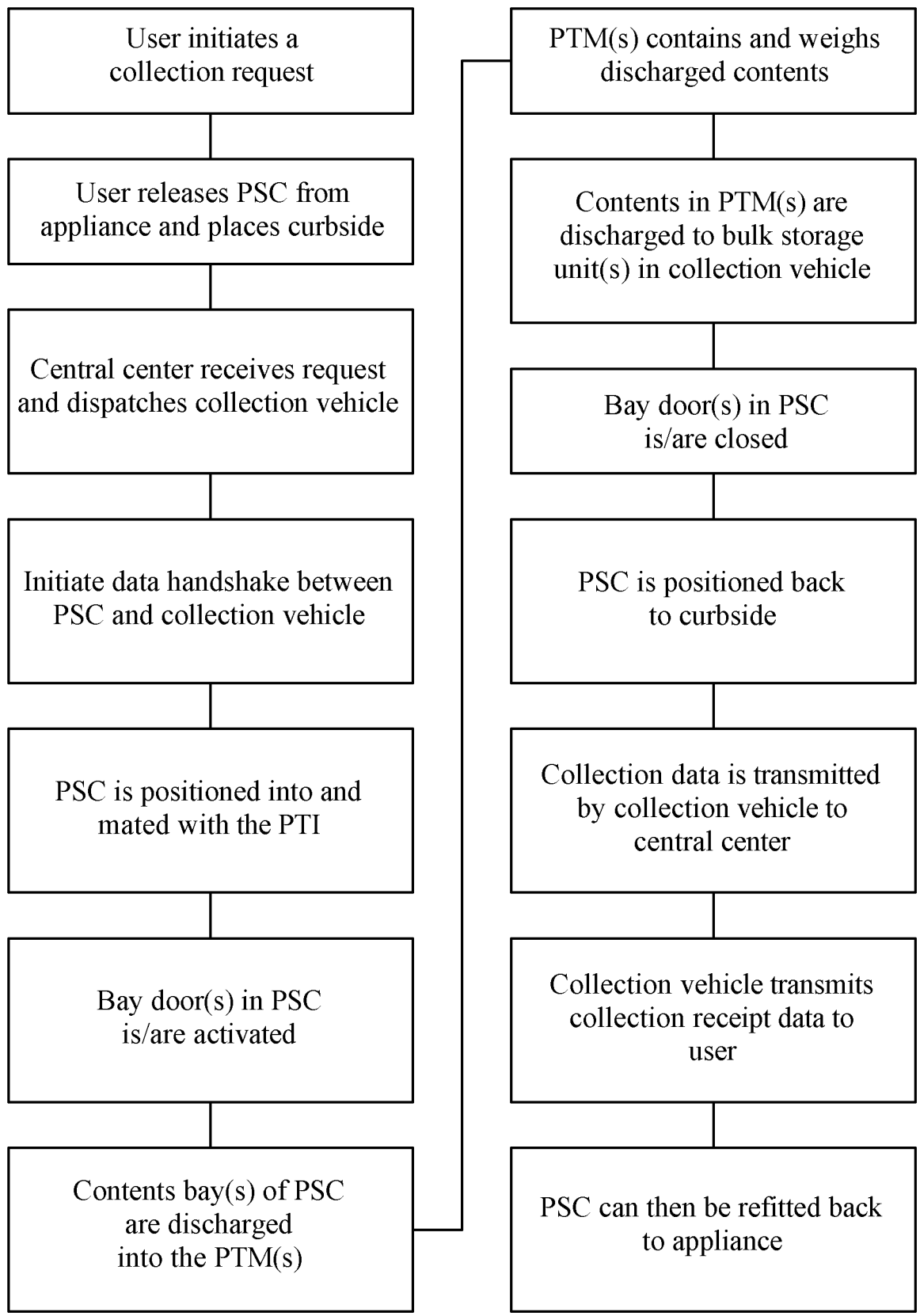
FIG. 11 is a block diagram view of the used-material collection or transfer method of the present technology.

With reference to FIG. 11, a general and exemplary method of utilizing the present technology is illustrated. In use, it can now be understood that a user/customer initiates a collection request by placing an on-demand request for collection via the appliance or a software application associated with the appliance, the PSC and/or the electronic device. It can be appreciated that the software application can include a GUI that provides selectable options or affordances, and/or input areas that allow the user/customer to provide a collection request or other information to the control center.

The control center can receive the collection request and then provide a dispatch order to the collection vehicle. The consumer can release the PSC from the main appliance and wheels or transports the PSC to the curbside ready for collection.

The collection vehicle arrives and positions itself appropriately in relation to the PSC. Upon arrival, there is a handshake between the PSC and collection vehicle via RFID or other method to confirm the PSC being collected is the correct unit registered to the main appliance and address where the collection request originated.

The collection vehicle operator deploys the PCM, and positions the PCM end effector 60, utilizing the articulated sections, with relevant degrees of freedom to account for variations in terrain and PSC orientation, to engage with the PSC. The Product Transfer Module (PTM) performs the interfacing with the computer system of the PSC.

Once the PCM end effector is engaged with the PSC the locking mechanism is activated from the PCM controls to interface with the PSC. The locking mechanism first orientates and then locks the PSC into position. In the exemplary, the locking mechanism can be, but is not limited to, an eccentric hook driven by an electric motor designed to draw the PSC onto the pickup arm and repeatedly center it.

Once the PSC is located correctly on the PCM end effector the PCM moves to an indexed discharging position whereby the PSC is accurately presented to the product transfer module (PTM) and specifically the product collection interface (PCI) located on the side of the product collection vehicle.

The PSC can be mated to the product collection interface (PCI) via a gasket system to ensure there is no cross contamination between product streams during transfer from the PSC to the bulk product housing units (BPHU) within the PCV. Furthermore, the product transfer module (PTM) can activate the bay doors in the PSC so they open and release the stored contents upon contact with the product collection interface (PCI) or when the PSC is in a predetermined orientation.

In the indexed or discharging position, the PSC is then capable of discharging the contents therein through the open bay doors and into the PTM. This discharging of the contents can be achieved by gravity, by the shape of the PSC, and/or by the assistance of blasting air into the PSC via the air nozzles. The PSC presentation angle to the PCI (over 90 degrees) also encourages contents to flow from the PSC to PTMs.

As each content stream transfers from the PSC and through the PCI, the contents are captured in the product transfer module (PTM) The PTMs can comprise of a number of containers (one for each content stream) with a greater volume than the individual PSC bays.

When the various contents are captured in their appropriate PTM area the contents of each product stream are weighed. The data can then be transmitted to the control center or the database where the weights for each content stream collected from a consumer are stored.

Once the contents have been weighed, the release within the PTM is activated and the contents are transferred to the individual compartments of the bulk product holding unit (BPHU) within the product collection vehicle (PCV).

After which, the PSC bay doors are closed via the same system used to initially open them and the PCM places the PSC back on the curbside. The PCM end effector releases the locking mechanism, and the PCM withdraws from the PSC, thereby releasing the PSC from the PCM. The PCM can then move to a pre-set transit position to allow the collection vehicle to move onto the next residence.

A further transmission from the collection vehicle can inform the consumer via the main appliance or the software application that the collection has occurred and the PSC can be refitted to the main appliance. Furthermore, an alert or notification of collection can be sent to the electronic device notifying the user/customer that a collection operation has occurred and the PSC is ready for use.

It can be appreciated that the control center can further notify the user/customer of collection, or can provide weight data of all the contents collected from the PSC. This weight data may then be utilized in recycling reimbursement or government subsidy programs. Further, the control center can share this weight data to a social media platform, where multiple users/customers can see the total weight of collected contents for each user/customer. Thereby promoting a hierarchy ranking of users/customers to encouraging recycling of material.

By means of the extraction of data received from the PSC in a system management can be obtained:

Date, time and residence information of collection request provided from the appliance, the PSC and/or the GUI of the electronic device;

Date, time and residence information from the collection vehicle when collect was conducted, weight of contents from each compartment of the PSC and/or total weight of all contents from the PSC; and Date, time and residence information from the collection vehicle when collect was conducted with number of bottle bill or deposit return scheme qualifying containers.

In terms of monitoring of the information, the GUI can provide:

Inputting of a collection request;
Displaying of date and time of collection;
Alerting prior to collection that collection is upcoming;
Displaying on a map a location of the collection vehicle and possible estimated time of arrival;
The percentage fill the PSC or each compartment of the PSC Historical filling;
Battery status of a battery associated with the appliance and/or PSC The total content weight of each compartment collected; and
Historical content weight and/or collection requests.

In some or all embodiments, the bay doors of the PSC can be opened simultaneously so all the different and segregated contents are captured and weighed at the same time. In some or all embodiments, the bay doors of the PSC can be activated one at a time so the contents can be collected sequentially.

According to one aspect, the present technology can include a used-material collection, processing and resultant recycled system including a product storage container (PSC) 12, a product collection interface (PCI) 44, a product transfer module (PTM) 46 and a bulk product holding unit (BPHU) 42. The product storage container (PSC) 12 can include one or more compartments 16 with a door 20 associated with each compartment 16. The compartment 16 can be configured to store resultant recycled product or content 2. The product collection interface (PCI) 44 can be associated with a vehicle 40. The product collection interface (PCI) 44 can be configured to engage with any one or any combination of the product storage container (PSC) 12, and the compartment or compartments 16 of the product storage container (PSC) 12. The bulk product holding unit (BPHU) 42 can be associated with the product transfer module (PTM) 46 and can be configured to receive the resultant recycled product or content 2 of the compartment or compartments 16 of the product storage container (PSC) 12. The product transfer module (PTM) 46 can include a weight determining unit and a release mechanism. The weight determining unit can be configured to determine or calculate a total weight of the resultant recycled product or content 2 in each of the individual compartments of the product storage container (PSC) 12. The release mechanism can be configured to discharge the resultant recycled product or content 2 in each of the individual compartments of the product storage container (PSC) 12 into the matching individual product storage compartments contained in the bulk product holding unit (BPHU) 42 associated with the vehicle 40.

According to another aspect, the present technology can include a method for transferring the resultant recycled product or content 2 into a bulk product holding unit (BPHU) 42 utilizing a product collection vehicle (PCV) 40. The method can include providing to a collection or transfer vehicle or a control center a collection or transfer request from a graphical user interface associated with a used-material collection, processing and resultant recycled product storage container appliance or an electronic device including at least one processing and at least one memory in operable communication with processing unit. The graphical user interface can include at least one selectable element or affordance. Positioning a product storage container (PSC) 12 at a location accessible to the collection or transfer vehicle 40. Receiving by a computer system 100 of the collection or transfer vehicle 40 residence or place information from the product storage container (PSC) 12, and the collection or transfer request.

Determining, by the computer system 100 of the product collection vehicle (PCV) 40, if the residence or place information from the product storage container (PSC) 12 matches residence or place information of the collection or transfer request, and if so then operating a product collection module (PCM) 50 which incorporates an end effector 60 configured to manipulate and align the product storage container (PSC) 12 to engage with a product collection interface (PCI) 44 of the product collection vehicle (PCV) 40. Opening a door 20 associated with the product storage container (PSC) 12 so that the resultant recycled product or content 2 in the product storage container (PSC) 12 is discharged into the product transfer module (PTM) 46 and then onto a bulk product holding unit (BPHU) 42 in the product collection vehicle (PCV) 40. Weighing each of the resultant recycled products or contents 2 into the bulk product holding unit (BPHU) 42 to generate weight data for each resultant recycled products or content. Discharging the resultant recycled products or content 2 from the bulk product holding unit (BPHU) 42 of the product collection vehicle (PCV) 40. Providing the weight data to any one or any combination of a computer system 131 of the control center 130, and the electronic device 4.

According to yet another aspect, the present technology can include a non-transitory computer readable medium with an executable program stored thereon comprising instructions for execution by at least one processing unit for managing a resultant recycled products or content collection or transfer system, such that the instructions when executed by the at least one processing unit causes the at least one processing unit to receive, by the at least one processing unit, a collection or transfer request from a graphical user interface used-material collection, processing and resultant recycled product storage container appliance or an electronic device. Then to dispatch a product collection vehicle (PCV) 40 to a residence or place associated with the collection or transfer request. Then to confirm residence or place information received from a product storage container (PSC) 12 matches residence or place information in the collection or transfer request. Then after the resultant recycled products or content 2 are received from the product storage container (PSC) 12 they are weighed before they are transferred into a bulk product storage unit (BPSU) 42. Then to create weight data associated with the resultant recycled products or content 2, and to provide the weight data to the control center 130 or the electronic device 4.

According yet to another aspect, the present technology can include a client-side electronic system for controlling a resultant recycled products or content collection or transfer operation. The client-side electronic system can include a memory and a processor that are respectively configured to store and execute software instructions, including instructions that are organized into a collection or transfer request component, a dispatching component, a confirmation component, a weighing component, and a weight data component. The collection or transfer request component can be configured or configurable to provide a collection or transfer request from a graphical user interface collection, processing and resultant recycled product storage container appliance or an electronic device to a product collection vehicle (PCV) 40 or a control center 130. The dispatching component can be configured or configurable to dispatch a product collection vehicle (PCV) 40 to a residence or place associated with the collection or transfer request. The confirmation component can be configured or configurable to confirm residence or place information received from a product storage container (PSC) 12 matches residence or place information in the collection or transfer request. The weighing component can be configured or configurable to weigh resultant recycled products or content in a product storage container (PSC) 12 of the collection or transfer received from the product storage container (PSC) 12. The weighing component can be further configured or configurable to create weight data associated with the resultant recycled products or content 2, and to provide the weight data to the control center 130 or the electronic device 4.

Some or all embodiments of the present technology can include a product transfer module (PTM) 46 attached to and associated with the product collection vehicle (PCV) 40. The product collection module (PCM) 12 incorporating an end effector 60 configured to manipulate and center the product storage container (PSC) 12, can be used to raise and reliably engage the product storage container (PSC) 12 with the product collection interface (PCI) 44.

Some or all embodiments of the present technology can include an arm 50 articulately associated with the product collection vehicle (PCV) 40 and the product transfer module (PTM) 46. The arm 50 can be configured to raise and manipulate the product storage container (PSC) 12 to engage with the product collection interface (PCI) 44.

In some or all embodiments, the product collection module (PCM) 50 can include a locking mechanism configured to secure the product storage container (PSC) 12 to the product collection module (PCM) 50.

In some or all embodiments, the locking mechanism can be an eccentric hook 60 configured to engage with a pin 28 of the product storage container (PSC) 12.

In another embodiment, the locking mechanism can be an electromagnetic controlled device configured to engage with the product storage container (PSC) 12.

In some or all embodiments, the interface or connection between the product storage container (PSC) 12 and product transfer module (PTM) 46 is the product collection interface (PCI) 44.

In some or all embodiments, the product collection interface (PCI) 44 has doors that match the doors 20 on the product storage container (PSC) 12.

In some or all embodiments, the matching doors when open allow resultant recycled products or content 2 to transfer from the individual product storage container (PSC) compartments 16 through the product collection interface (PCI) 44.

In some or all embodiments, the resultant recycled products or content 2 having transferred past the product collection interface (PCI) 44 are transferred into the compartments of the bulk product holding unit (BPHU) 42 via the product transfer module (PTM) 46.

In some or all embodiments, the product storage container (PSC) 12 can include a transmitting device 26 configured to transmit data to a receiving device on the product collection module (PCM) 12, the product collection interface (PCI) 44 or the product collection vehicle (PCV) 40.

In some or all embodiments, the transmitting device 26 can be a radio-frequency identification tag, and the receiving device is a radio-frequency identification reader 112.

In some or all embodiments, the release mechanism can be a flap 80 associated with a discharge end 76 of the product transfer module (PTM) 46.

In some or all embodiments, the weight determining unit can be associated with the flap 80.

In some or all embodiments, the product transfer module (PTM) 46 can include a receiving end configured to receive the resultant recycled products or content 2 from each individual compartment 16 of the product storage container (PSC) 12. The discharge end 76 can include an air nozzle 75 configured to dispense a blast of air into each individual compartment 16 of the product storage container (PSC) 12.

In some or all embodiments, a compartment of the product storage container (PSC) 12 can be a plurality of compartments 16, and the product collection interface (PCI) 44 including a plurality of doors or opening corresponding with the compartments of the bulk product holding unit (BPHU) 42.

In some or all embodiments, the bulk storage compartment of the bulk product holding unit (BPHU) 42 can be a plurality of storage compartments each configured to receive a single or mixed stream of resultant recycled products or content 2 from one of the compartments 16 of the product storage container (PSC) 12.

In some or all embodiments, a receiving end of the product transfer module (PTM) 46 can be a plurality of receiving ends each configured to receive resultant recycled products or content 2 from one of the compartments 16 of the product storage container (PSC) 12 when the product storage container (PSC) 12 is correctly positioned with the product collection interface (PCI) 44.

In some or all embodiments, the product transfer module (PTM) 46 can include one discharge end configured to receive resultant recycled products or content 2 from each of the receiving ends.

In some or all embodiments, the release mechanism can be a flap 80 associated with the discharge end 76, and the weight determining unit can be associated with the flap 80, the discharge end 76 or another aspect of the product transfer module (PTM) 46.

Some or all embodiments of the present technology can include an electronic device 4 and a graphical user interface. The electronic device 4 can include at least one processing unit in operable communication with at least one memory and a display. The graphical user interface can be associated with the electronic device 4 and displayable on the electronic device. The graphical user interface can include at least one selectable element or affordance configured or configurable to provide at least one input associated with a collection or transfer request provided to the product collection vehicle (PCV) 40 or a control center 130 for dispatching the product collection vehicle (PCV) 40.

While embodiments of the recycled material or products or used-material or waste collection system and method have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although collecting and weighing segregated recycled products or materials or waste material have been described, it should be appreciated that the recycled products, material, used-material or waste collection system and method herein described is also suitable for any residential or office or business or organization or industrial collection of used-material.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. A content collection system comprising:
   a product storage container (PSC) including a plurality of compartments and a door associated with each of the compartments, the compartments being configured to store content;
   a product transfer module associated with a vehicle incorporating a product collection interface (PCI), the product collection interface being configured to engage with any one or any combination of the product storage container, and the compartments of the product storage container;
   wherein the product transfer module is associated with the product collection interface and configured to receive the content of the product storage container, the product transfer module including a weight determining unit and a release mechanism, the weight determining unit being configured to determine or calculate a weight of the content in the product transfer module, the release mechanism including a rotating container having a plurality of interface compartments and configured to discharge the content from each of the interface compartments of the release mechanism of the product transfer module to one or more bulk product holding units associated with the vehicle;
   wherein the interface compartments are configured to correspond and align with the compartments of the product storage container when the product storage container is received in the product collection interface.

2. The system according to claim 1 further comprising a product collection module articulately associated with the vehicle, the product collection module being configured to raise and manipulate the product storage container to engage with the product collection interface.

3. The system according to claim 2, wherein the product collection module includes an end effector including a locking mechanism configured to secure the product storage container to the end effector.

4. The system according to claim 3, wherein the locking mechanism is a hydraulically controlled clamp configured to engage with specific geometry of the product storage container, wherein at least a part of the end effector is received in the product storage container and is pivoted to draw the product storage container into correct alignment with the end effector before locking the product storage container into position.

5. The system according to claim 2, wherein the product storage container includes a transmitting device configured to transmit data to a receiving device of the product collection module, the product collection interface or the vehicle.

6. The system according to claim 5, wherein the transmitting device is a radio-frequency identification tag, and the receiving device is a radio-frequency identification reader.

7. The system according to claim 1 further comprising a product collection module articulately associated with the vehicle and the product transfer module, the product collection module being configured to raise and manipulate the product storage container to engage with the product transfer module.

8. The system according to claim 1, wherein the release mechanism is a flap associated with a discharge end of the product transfer module.

9. The system according to claim 8, wherein the weight determining unit is associated with the flap.

10. The system according to claim 1, wherein the rotating container is capable of weighing contained materials and is associated with a discharge end of the product transfer module.

11. The system according to claim 10, wherein the weight determining unit is associated with the rotating container.

12. The system according to claim 1, wherein the product transfer module includes a receiving end configured to receive the content from the product storage container, and wherein the receiving end includes an air nozzle configured to dispense a blast of air into the compartments.

13. The system according to claim 1, wherein the bulk product holding units in the vehicle are a plurality of storage compartments each configured to receive the content from one of the compartments of the product storage container.

14. The system according to claim 1, wherein a receiving end of the product transfer module is a plurality of receiving ends each configured to receive the content from one of the compartments of the product storage container when the product storage container is received in the product collection interface.

15. The system according to claim 14, wherein the product transfer module includes a discharge end configured to receive the content from each of the receiving ends.

16. The system according to claim 15, wherein the release mechanism is a flap associated with the discharge end, and the weight determining unit is associated with the flap or the discharge end.

17. The system according to claim 15, wherein the rotating container is capable of weighing contained materials and is associated with the discharge end.

18. The system according to claim 1 further comprising:
   an electronic device including at least one processing unit in operable communication with at least one memory and a display, and
   a graphical user interface associated with the electronic device and displayable on the electronic device, the graphical user interface comprising at least one selectable element or affordance configured or configurable to provide at least one input associated with a collection request provided to the vehicle or a control center for dispatching the vehicle.

19. The system according to claim 1, wherein the release mechanism is a flap associated with an input or inlet to the bulk product holding unit.

20. The system according to claim 1, wherein the release mechanism includes the weight determining unit that is capable of weighing contained materials and associated with an input or inlet to the bulk product holding unit.

21. A method for collecting content from a product storage container utilizing a collection vehicle, the method comprising the steps of:
- a) providing to a product collection vehicle or a control center a collection request from a graphical user interface associated with an appliance or an electronic device including at least one processing unit and at least one memory in operable communication with the processing unit, the graphical user interface including at least one selectable element or affordance;
- b) positioning a product storage container at a location accessible to the product collection vehicle, the product storage container including a plurality of compartments;
- c) receiving by a computer system of the product collection vehicle a residence information from the product storage container, and the collection request;
- d) determining, by the computer system of the product collection vehicle, if the residence information from the product storage container matches the residence information of the collection request, and if so then operating a product collection module to manipulate the product storage container to engage with a product collection interface of the product collection vehicle;
- e) opening a door associated with each of the compartments of the product storage container so that content in the product storage container is discharged into corresponding interface compartments of a rotating container associated with the product transfer module of the product collection vehicle;
- f) weighing the content in the product transfer module to generate weight data;
- g) discharging the content from the product transfer module into a bulk product holding unit of the product collection vehicle; and
- h) providing the weight data to any one or any combination of the computer system of the control center, and the electronic device.

* * * * *